(No Model.)

L. M. & A. E. AUSTIN.
Fence.

No. 236,662.  Patented Jan. 18, 1881.

Witnesses
W. H. Mortimer
A. C. Kishadden

Inventors
L. M. Austin
A. E. Austin
per
F. A. Lehmann,
Atty.

N. PETERS, PHOTO-LITHOGRAPHER, WASHINGTON, D. C.

United States Patent Office.

LUCIUS M. AUSTIN AND ARIUS E. AUSTIN, OF CARTHAGE, ILLINOIS.

FENCE.

SPECIFICATION forming part of Letters Patent No. 236,662, dated January 18, 1881.

Application filed November 10, 1880. (No model.)

*To all whom it may concern:*

Be it known that we, LUCIUS M. AUSTIN and ARIUS E. AUSTIN, of Carthage, in the county of Hancock and State of Illinois, have invented certain new and useful Improvements in Fences; and we do hereby declare the following to be a full, clear, and exact description of the invention, such as will enable others skilled in the art to which it pertains to make and use it, reference being had to the accompanying drawings, which form part of this specification.

Our invention relates to an improvement in fences; and it consists in attaching an iron rod to the upper end of the brace, which rod extends diagonally across the brace and hooks into the eyebolt, which passes through one end of the panel of the fence, the brace being made sufficiently wide to bear equally against the jointed ends of two different panels.

It further consists in securing to the lower end of the brace a cross-piece, over and around which are driven pins, which hold the lower end of the brace in position, as will be more fully described hereinafter.

The object of our invention is to make a portable fence which is held in place by means of braces, and to firmly support the adjoining ends of two panels by the same brace.

Figure 1:
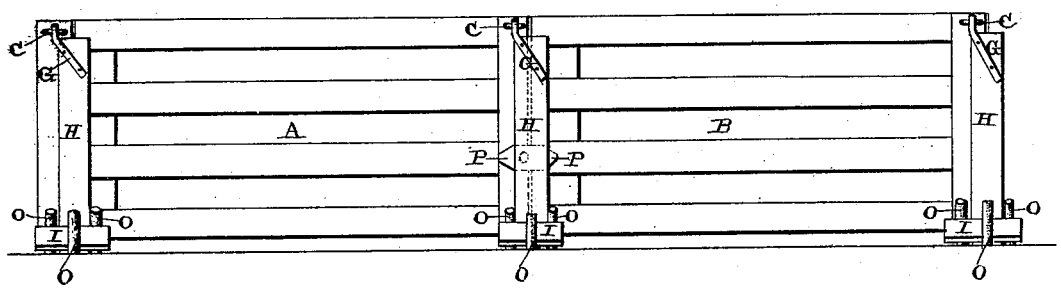
Figure 2:
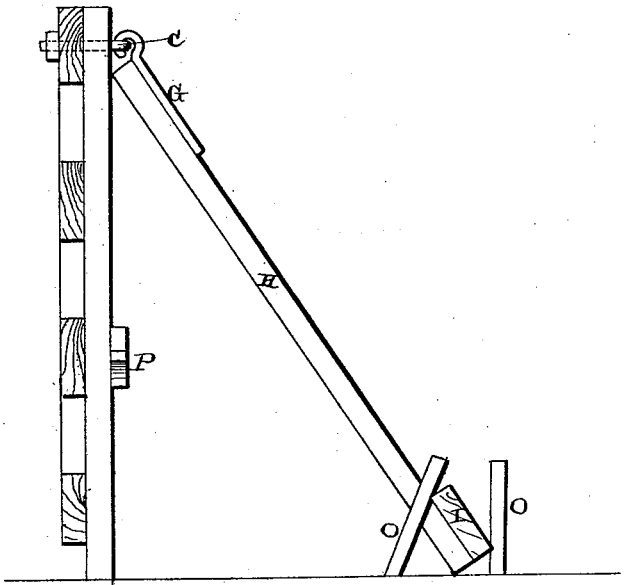
Figure 3:
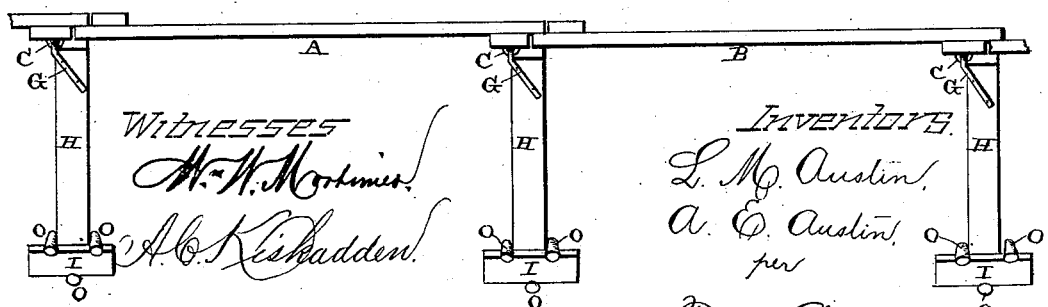

Figure 1 is a side elevation of our invention. Fig. 2 is an end view of the same. Fig. 3 is a plan view.

A B represent two panels of a fence, which have the boards secured to alternate sides of the uprights, so that when placed together the two ends will overlap each other, as shown. Passed through one end of each of the panels is a bolt, C, into which hooks the iron rod G, which is secured diagonally across the upper end of the wide brace H. This iron rod, having a hook formed upon its upper end, is made to extend diagonally across the upper end of this wide brace, so as to hook into the eyebolt, and yet allow the brace to bear equally against the ends of each one of the panels. To the lower end of each one of these wooden braces is secured a cross-piece, I, and driven into the ground upon opposite sides of the cross-piece are the stakes or pins O, which securely hold the lower ends of the wooden braces in position. Also, secured to one of the panels of the fence, near its lower edge, is a button or other suitable catch, P, which overlaps the adjoining end of the next panel, and thus holds the two ends securely together near the ground.

When it is desired to make fences of more than usual strength, the braces may be applied to both sides of the fence instead of to one only.

Should it be desired at any time to remove the fence, or any section of it, it is only necessary to remove the pins or stakes from the ground, and thus free the lower end of the brace, when the whole panel of the fence to which the brace is secured by means of the hooked iron rod can be removed from the fence.

This fence is adapted for use upon both level and hilly ground, and will be found to make a very strong and substantial fence for any and all purposes.

Having thus described our invention, we claim—

1. The combination of two adjoining panels of a fence which slightly overlap each other with a brace which bears equally against the ends of both panels, substantially as shown.

2. The combination of two adjoining panels of the fence having overlapping ends with an eyebolt which passes through one of the panels, a brace having the diagonal hooked rods secured to it to catch in the eye, and which brace bears equally against both ends of the two panels, substantially as described.

3. The combination, with two panels of a fence which have overlapping edges, of the eyebolt which passes through one of the panels, the brace having the diagonal hooked rod secured to its upper end, and a button which is secured to the same panel of the fence as the eyebolt, and which catches over the adjoining edge of the other panel, substantially as specified.

In testimony that we claim the foregoing we have hereunto set our hands this 2d day of November, 1880.

LUCIUS M. AUSTIN.
ARIUS E. AUSTIN.

Witnesses:
JOHN R. NEWTON,
G. W. PAYNE.